United States Patent [19]

Curto

[11] 4,339,409

[45] * Jul. 13, 1982

[54] METHOD OF FORMING BLOWN POLYETHYLENE TEREPHTHALATE CONTAINERS

[75] Inventor: Nicholas J. Curto, Monroe, Mich.

[73] Assignee: Owens-Illinois, Inc., Toledo, Ohio

[*] Notice: The portion of the term of this patent subsequent to Nov. 11, 1997, has been disclaimed.

[21] Appl. No.: 228,652

[22] Filed: Jan. 26, 1981

[51] Int. Cl.³ .............................................. B29C 17/07
[52] U.S. Cl. .................................... 264/509; 264/521; 264/526
[58] Field of Search ............... 264/509, 521, 523, 526, 264/529, 530, 532, 535; 215/1 C

[56] References Cited

U.S. PATENT DOCUMENTS 4,164,298  8/1979  Nishikawa et al. ............. 264/521 X
4,233,262 11/1980  Curto .................................. 264/509

Primary Examiner—Jan H. Silbaugh
Attorney, Agent, or Firm—Charles S. Lynch; M. E. Click; D. H. Wilson

[57] ABSTRACT

A method is disclosed for blow molding poly(ethylene terephthalate) preforms, such as injection molded parison, to achieve exterior surface embossed designs on blown containers without using profiled blow mold cavity walls. In the method, a raised profile is molded or otherwise formed on the exterior wall of the preform, defining a preform wall portion having embossed areas. Then the entire preform is heated to blowing temperature and it is also disclosed that when the raised portion is at the same time raised to a higher temperature the embossed design of the preform is opacified by crystallization without crystallizing the balance of the preform. Thereafter, the preform is blow molded under conditions such that the poly(ethylene terephthalate) material strain hardens in order to cause the different wall thicknesses to expand and stretch essentially proportionately. The blown containers with an embossed design formed by this method include a surface contour which is essentially proportionately shaped to the surface profile formed on the pre-existing preforms.

5 Claims, 9 Drawing Figures

METHOD OF FORMING BLOWN POLYETHYLENE TEREPHTHALATE CONTAINERS

This disclosure relates generally to a unique method of forming blown containers having exterior embossed designs or decorations.

Prior to the invention, patterns, grooves, logos or other surface contours have been imparted to the exterior surface of blown thermoplastic containers in the final blow molding step by contours on the interior side walls of the blow mold cavity. Examples of bottles formed in this manner are shown in U.S. Pat. Nos. 3,403,804 and 3,397,724.

This procedure has been generally undesirable because of the expenses involved in machining or otherwise providing the contours on the mold walls and because the contoured molds can only be used for a particular job. Unfortunately, these problems have been unavoidable prior to my invention since no satisfactory alternative has been available.

The present invention overcomes these problems by applying a desired embossed design or raised strengthening pattern to a parison or preform, particularly of poly(ethylene terephthalate) material, heating the preform to blowing temperature and then proportionately enlarging that contour as the parison is blown into the final article within a standard blow mold cavity having smooth interior walls. Moreover, when the embossment is preferentially heated to a higher temperature than the rest of the parison, such that the raised surfaces crystallize and become opaque or white while the balance of the preform remains transparent and uncrystallized.

Of course, parisons or preforms have been provided with contours and varying wall thicknesses prior to the present invention. However, such contours have been effected in other, conventional methods for various purposes: to achieve an interior reinforcement in the final container, as shown by U.S. Pat. No. 3,114,932; to achieve a visual effect, as shown by U.S. Pat. No. 3,420,924; or to form a reinforced bottle portion, as shown by U.S. Pat. Nos. 3,294,883, 3,137,748 and 3,754,851.

Additionally, the prior art of course recognizes that poly(ethylene terephthalate) is suitable for forming blown bottles, as shown by U.S. Pat. No. 3,733,309.

However, the prior art does not recognize that profiling may be provided to a thermoplastic preform or parison to achieve exterior embossments on a blown container. Additionally, the prior art does not teach that portions of a preform having differential thicknesses may be proportionally reduced in thickness during a blow molding operation. Furthermore, the art has not taught the preferential crystallization of the raised portions of the preform to achieve opacity thereof at the preform stage, which opacity carries over to the final blown product.

In my application Ser. No. 2,511, filed Jan. 11, 1979, now U.S. Pat. No. 4,233,262, I disclosed and claimed making surface profiles or contours on a blown poly(ethylene terephthalate) container, by imparting a proportionately shaped surface contour to a blowable preform and then expanding the contour proportionately with the other portions of the preform during the blow molding operation, but the method of forming opaque raised portions was not disclosed by me in said application.

This invention concerns a method of imparting exterior embossments or raised contours or designs to a blown thermoplastic hollow article, by imparting a proportionately shaped surface contour to a blowable preform and then expanding the contour proportionately with the other portions of the preform during the blow molding operation. The method is particularly suited for poly(ethyleneterephthalate), because this material exhibits the characteristic of strain hardening, thus enabling thick and thin sections of a preform to expand and stretch proportionately and carry the preform profile over to the blown container. This method distinguishes significantly from prior art methods where the thin sections of a parison are expanded to a greater extent in the blowing operation, such that the thick and thin sections are expanded non-proportionately. Further, it is uniquely a feature of the invention that when the raised portion is opacifyingly crystallized in the preform stage, the opacified embossment carries over to the final blown article.

More specifically, the method includes closing the sections of a blow mold around a blowable preform of suitable thermoplastic material, such as poly(ethylene terephthalate). In accordance with the invention, the preform includes a profiled exterior surface region defined by raised exterior surface embossments forming preform wall sections which are thicker than the remaining wall sections. Then (after suitable heat conditioning) in an essentially single operation, blow fluid is injected into the interior of the preform (a) to expand the preform outwardly, (b) to expand the thick wall sections or embossments of the preform essentially proportionately with the remaining wall sections of the preform, (c) to expand the outer surface of the profiled preform into engagement with an essentially smooth interior mold wall surface and (e) to form a blown plastic container having an exterior surface embossment. Additionally, the preform may optionally be axially stretched just prior to or during the blowing operation in the conventional manner.

When using the poly(ethylene terephthalate) material, the preform should be blown within a general range of conditions such that the material will strain harden during the blow molding operation and thus achieve the proportionate expansion in the thin and thicker wall sections of the preform. These parameters and conditions may vary in relationship to one another, but generally fall in the following ranges.

First, in order to obtain strain crystallization during orientation the overall preform should usually be at a temperature within the range of between about 75 degrees C. and 110 degrees C. depending upon the molecular weight (or inherent viscosity) of the material, with lower molecular weight materials generally requiring lower forming temperatures. Of course, as stated, the raised portions are heated hotter than the overall preform when effecting opacifying crystallization of the raised design before blowing.

This temperature cannot be precisely given in absolute terms, but will usually be on the order of 5-15 degrees C. hotter than the bottle sidewall. Trial and error in a given case will best determine the degree of elevation of the temperature of the raised portions over the sidewall temperature that will result in opacity before expansion in the raised portions while leaving the balance of the preform transparent.

Second, the orientation expansion is preferably effected at a rate that promotes strain crystallization, for example, the material can suitably be expanded at a rate of about one inch per inch per second; that is, the material can be expanded approximately one inch per second for every inch of starting length.

Third, the blow molding operation should be carried out by a blow fluid at a pressure of between about 100 and 600 psi; and more preferably by initially inflating the parison with fluid at a pressure of between about 150 and about 200 psi and then completing the blowing operation with fluid at a pressure of between about 350 and about 550 psi. These parameters may vary somewhat from the specified ranges, inasmuch as these ranges are derived from laboratory observations, and can also vary with the inherent viscosity, which is usually at least 0.5 dl/gm.

Accordingly, the present invention provides several significant advantages, including importantly the ability to use the same blow molds for several different distinctive embossed bottle designs. This is of particular importance from a commercial standpoint because (1) it is now unnecessary to machine separate blow molds for each bottle design and (2) job change-overs are not required. Further, it is uniquely advantageous to be able to provide permanent opaque embossed surface patterns.

Additionally, it has previously been difficult to achieve sharp details of embossments in blow molded articles or containers. In this invention, the details are present in the preform and are simply carried over into the container or other hollow article.

These and other advantages and meritorious features of the present invention will be more readily appreciated and understood from the following detailed description and appended claims.

Figure 3:
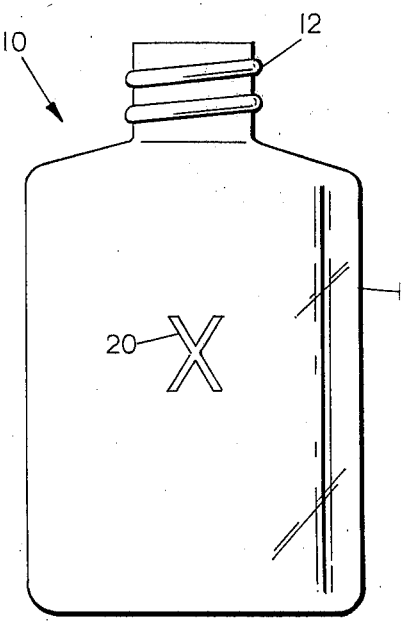
FIG. 3 illustrates the blown container having an exterior surface embossment proportionately shaped to the profile which previously existed in the blowable preform.

Referring now more particularly to the drawings, the overall method proposed by the present invention relates to the formation of a blown container such as that illustrated in FIG. 3 by reference numeral 10, and including an exterior embossed profile or decoration 20. More generally, however, the method relates to the formation of a blown container having a thin wall section that is expanded proportionately with the thicker wall sections of a preform during a stretch-and-blow or blow molding operation. As previously discussed, this method is particularly suitable for poly(ethylene terephthalate) material because of that material's ability to achieve extensive strain hardening (strain crystallization) during a blow molding operation.

Accordingly, this method offers significant utility in the formation of exterior raised surface designs on blown containers, such as spirals, flutes, grooves, patterns, logos, indicia and other decoration.

Figure 1:
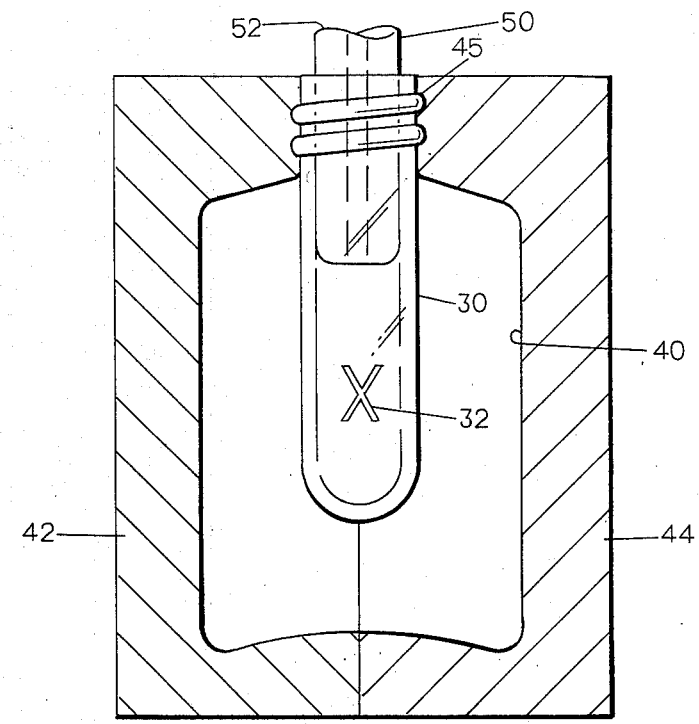
FIG. 1 is a schematic illustration, showing a profiled preform enclosed within a blow mold cavity.
Figure 2:
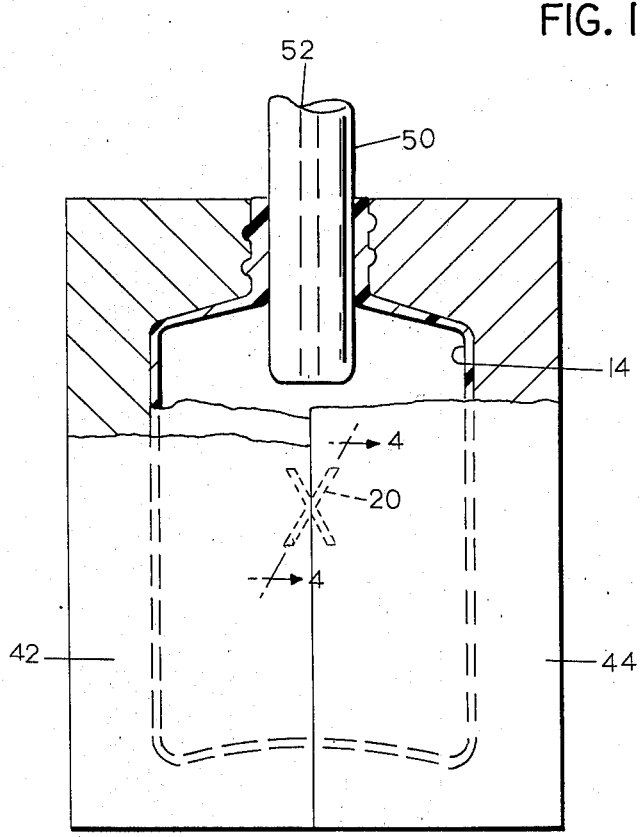
FIG. 2 is a schematic illustration showing the preform blown to a container within the blow mold cavity.

Referring to FIG. 1, the method of this invention includes enclosing a blowable thermoplastic preform 30 within a blow mold cavity 40 defined by closed mold sections 42 and 44. It will be understood that the mold sections are opened and closed by suitable power means (not shown) such as hydraulic rams. Additionally, the blow molds include a finish-forming region 45 which forms a neck or finish 12 on the blown container.

The thermoplastic preform 30, when positioned within the mold cavity, includes an external raised surface contour or profile 32, which may be formed by various techniques, as desirable. For example, the surface embossment may be formed on the preform during an injection molding step.

After the sections 42 and 44 have closed around the preform 30, a blow rod 50 having a fluid supply passageway 52 is axially inserted into the neck portion of the preform. Thereafter, blow fluid under pressure is injected into the interior of the preform 30 by way of passageway 52, thereby expanding the preform outwardly into contact with the mold cavity 40 and forming the blown body portion 14 of the container. This blow molding operation and the behavior of the thermoplastic material in the region of the exterior embossment 32 are illustrated particularly in FIGS. 4-7.

Figure 4:
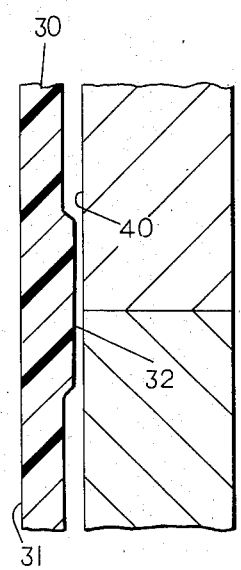
FIGS. 4-7 are enlarged fragmentized views, illustrating the manner in which the preform expands into engagement with the mold walls in the region of the external surface indentation.
Figure 5:
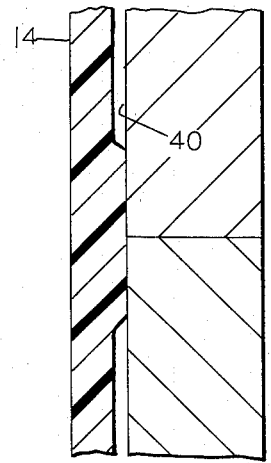
Figure 6:
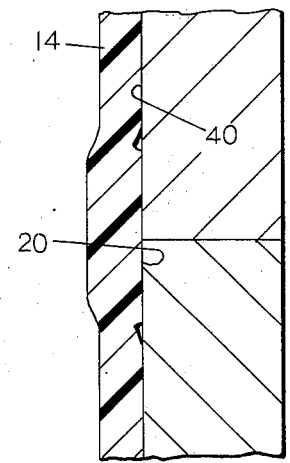
Figure 7:
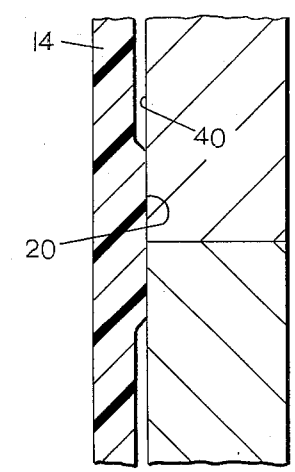

FIG. 4 illustrates the plastic preform just prior to striking the mold wall surface 40. As shown, the exterior embossment 32 has expanded essentially to the size of the surface decoration 20. FIG. 5 illustrates the plastic material at the moment when surface embossment 20 strikes the smooth mold wall surface 40, with the plastic material having been stretched and expanded only slightly from its configuration of FIG. 4. FIG. 6 illustrates what is believed to occur when the full blowing pressure within the blown article 40 has developed, causing the plastic material around the region of the surface design 20 to be pressed against the mold wall surface 40. This blowing pressure may be relieved within a short time by venting the interior of the blown shape, permitting the plastic material in the region around the surface embossment 20 to return essentially to its position of FIGS. 4 and 5, as shown in FIG. 7. It is believed that this retraction of the plastic material occurs because the plastic material preferred for this invention, poly(ethylene terephthalate), strain hardens during the stretching operation under proper stretching conditions, and therefore has an elastic memory for its original position.

Upon completion of the blowing operation, the surface design 32 is stretched and expanded substantially proportionately with the other portions of the preform to form surface design 20, even though this preform portion is thicker than the remaining preform portions. It is believed that the raised surface is maintained in the final article of the present invention and that the proportional expansion occurs because poly(ethylene terephthalate) plastic is susceptible to strain hardening during the blow molding operation. In order to achieve the maximum strain hardening, however, the blow molding conditions should be maintained to within certain specified conditions. For example, the pressure of the blowing fluid should be within the range of from about 100 to 600 psi. Most preferably, the parison is expanded in response to an initial lower pressure and then to a final high pressure in order to achieve good bottle characteristics, particularly clarity and uniform expansion. The initial low pressure is applied for example for about one-half second or somewhat more and is in the range of about 150 to 200 psi. The final high pressure is usually in the range of about 350 to 550 psi. These pressures may be regulated by suitable regulator controls and flow valves (not shown) which do not form a part of the present invention.

Depending upon the particular molecular weight (or inherent viscosity) of the material, the parison is usually thermally conditioned to have an average temperature broadly within the range of between about 75 degrees C. and 110 degrees C. This temperature range is particularly suitable for poly(ethylene terephthalate) having an inherent viscosity of between about 0.5 and about 1.1, with the lower inherent viscosity materials generally requiring lower temperatures. The poly(ethylene terephthalate) used usually has an inherent viscosity of 0.5 to 0.9 dl/gm. Of course, when the embossment has been heated for crystallization in the preform stage it is somewhat hotter than the balance of the preform, as previously mentioned.

The inherent viscosities referred to herein are measured at 25° C., using a solution of 0.25 gms. of polymer dissolved in 100 milliliters of a mixture of 3 weight parts phenol with 2 weight parts 1,1,2,2-tetrachloroethane. The results are in dl/gm.

Figure 8:
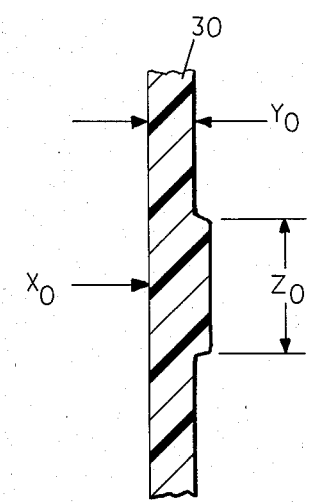
FIGS. 8 and 9 are schematic illustrations depicting the proportionate expansions between the thin and thick regions of the preform.
Figure 9:
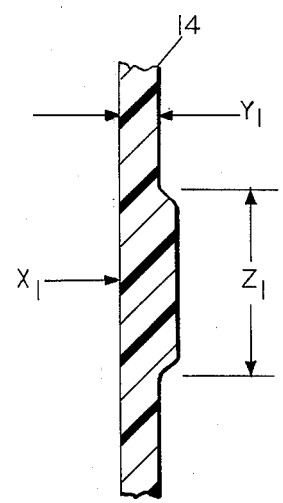

In FIGS. 8 and 9, the ideal proportionate relationship between the corresponding preform and final container portions is schematically illustrated. By way of explanation, $X_0$ indicates the thickness of the thick preform portion corresponding to the surface embossment 32; $Y_0$ indicates the thickness of the preform wall 30; and $Z_0$ indicates the length of the thick preform wall portion. Likewise, $X_1$ refers to the thickness of the thick container portion, corresponding to the surface embossment 20; $Y_1$ indicates the thickness of the blown container wall 14 adjacent the surface embossment; and $Z_1$ indicates the length of the thick container wall portion. Although not shown, $W_0$ and $W_1$ are intended to respectively designate the widths of the thick preform wall portion and of the thick container wall portion. Accordingly, $Z_0W_0$ and $Z_1W_1$ represents the respective surface areas of the thin preform wall portion and the thin container wall portion.

In the method of the present invention, the ratios between the corresponding thicknesses of the preform and container are essentially equivalent. That is:

$$X_0/X_1 \approx Y_0/Y_1$$

Additionally, the ratio of the thick preform portion to the thin preform portion is essentially equal to the ratio of the corresponding container portions with respect to one another. That is:

$$X_0/Y_0 \approx X_1/Y_1$$

Further, the ratios between the corresponding thickness of the preform and container are essentially equivalent to the ratio of the final embossed surface area after stretching to the original embossed surface area. That is:

$$X_0/X_1 \approx Y_0/Y_1 \approx Z_1W_1/Z_0W_0$$

It is to be understood that the foregoing disclosure is exemplary in nature, rather than limiting. For example, the invention has been disclosed primarily in reference to poly(ethylene terephthalate) material. However, the invention is equally adaptable to similar types of thermoplastic materials which are highly susceptible to proportionately expanding different wall thickness portions during stretching, such as in a blow molding operation.

Additionally, the blow molding operation may include an axial stretching step in order (1) to proportionately expand the preform and exterior embossment in the axial and radial directions and (2) to biaxially orient the material. Such an operation may be performed by either stretching the preform prior to or during the introduction of blow fluid into the preform, as is known in the art, reference being made to U.S. Pat. No. 3,865,530, incorporated by reference.

In a specific embodiment of the invention an injection molded parison made from poly(ethylene terephthalate) having an inherent viscosity of 0.72 is molded with an X as in FIG. 1. The wall thickness is 0.173 inches and the outside diameter is 0.9 inches with the X protruding radially 0.030 inches from the outer surface of the parison, and with legs of the parison being 0.040 inches across their width. The parison is placed inverted on a rotating support with a semicylindrical reflector, as shown for parison 10 in U.S. Pat. No. 4,079,104. While rotating it is passed by a heater box of ten horizontal high intensity infrared quartz heaters as in thermal conditioner 30 of said U.S. Pat. No. 4,079,104. The finish area of the preform is shielded by a water cooled shield.

The horizontal infrared heaters are numbered from 1 to 10 starting at the bottom. The centerline of bottom heater 1 is $\frac{3}{8}$ inch above the downwardly facing open end of the preform and the successive resistance heaters are spaced $\frac{3}{4}$ inch apart center to center. Heater No. 1 is not used and heaters 6–10 are above the closed end of the preform. Each heater element is $\frac{3}{8}$ inch O.D. and 15 inches along.

The bank of heaters is spaced from the preform so that the distance from the plane of the axis parallel to the heating elements is 2 inches from the plane intersecting the axes of the resistance heaters.

While rotating, the parison is passed longitudinally past the bank of heaters at a rate to result in an exposure of 30.5 seconds, to raise the temperature of the preform to orientation blowing temperature as before discussed and to additionally heat the raised portion to cause crystallization and opacity.

During this period the following voltages are applied to the respective heater elements as shown in the table below and the voltages correspond to the listed filament temperatures shown for the respective heater elements.

| HEATER ELEMENT NUMBER | VOLTAGE APPLIED (VOLTS) | FILAMENT TEMPERATURE |
| --- | --- | --- |
| 2. | 162 | 2150° K. |
| 3. | 225 | 2430 |
| 4. | 225 | 2430 |
| 5. | 130 | 1950 |
| 6. | 130 | 1950 |
| 7. | 137 | 2000 |
| 8. | 225 | 2430 |
| 9. | 145 | 2025 |
| 10. | 80 | 1600 |

After the 30.5 seconds exposure the parison is passed from exposure to the heating elements to a period of 19 seconds exposure to ambient room temperature. During this time two things occur: First, the difference in temperature decreases between the warmer outer wall of the preform and the inner wall; i.e., the inner wall heats somewhat and the outer wall cools. Second, the raised X becomes more opaque because of continued crystallization.

Thereafter, the preform is immediately closed in a blow mold and is blown to a hollow transparent bottle with a raised opaque X which is proportionately larger than on the preform.

Having therefore completely and fully disclosed my invention, I now claim:

1. In a method of forming a blown hollow shape of poly(ethylene terephthalate) having an exterior opaque embossed surface design, the steps of:

forming a blowable preform of poly(ethylene terephthalate) having an exterior embossed surface design defined by adjacent thick and thin wall portions destined to form the embossed design in the blown container;

thermally conditioning the preform to a temperature in a range where the material is susceptible to strain hardening, and at the same time heating only the raised design portions to a higher temperature at which said raised portions of the preform crystallize and thus becomes opaque;

enclosing the blowable preform within a blow mold cavity having a smooth wall portion;

introducing blow fluid under pressure into the interior of the preform and thereby (1) expanding the preform outwardly to conform to said cavity, including contacting both the thick and thin wall portions with said blow mold cavity smooth wall portion, (2) strain hardening the preform, and (3), proportionately expanding said thick and thin wall portions; and thereafter venting fluid under pressure from the interior of said blown shape to allow removal from the mold of a transparent, hollow blown shape having said exterior opaque embossed surface design.

2. The method as defined in claim 1, wherein (a) the preform is formed of poly(ethylene terephthalate) having an inherent viscosity within the range from 0.5 to 1.1 (b) the blow fluid is injected into the preform at a pressure of between about 100 and about 600 psi, and (c) the preform is at a temperature during the expansion step of between about 75 degrees C. and about 110 degrees C.

3. A method of blow molding a container having an exterior opaque embossed design, by the steps of:

providing a blowable preform of poly(ethylene terephthalate) with an exterior embossed design, thermally conditioning the blowable preform of poly(ethylene terephthalate) to a temperature within a range where the material is susceptible to strain hardening, and at the same time heating only the raised design portions to a higher temperature at which said raised portions of the preform crystallize and thus become opaque;

enclosing the thermally conditioned blowable preform within a blow mold cavity having a smooth wall surface in a region corresponding to that portion of the container which will include the exterior embossed design, the preform having an exterior embossed design which is smaller than the exterior embossed design on the container that it is destined to form; and establishing a pressure differential between the interior and exterior of the preform and thereby (a) expanding the material outwardly toward and against the mold walls, (b) strain hardening the material, and (c) proportionately expanding that portion of the preform including the embossed surface design with respect to the adjacent preform portions, and terminating said pressure differential, said method forming a transparent blown container having an exterior opaque embossed design corresponding to and proportionately larger than the exterior design of the preform.

4. The method as defined in claim 3, wherein the expanding step includes mechanically stretching the parison along its longitudinal axis and radially expanding the preform by introducing fluid under pressure into its interior.

5. In a method of forming a plastic container having an embossed exterior surface design on a blown body portion surmounted by a neck, the steps of:

providing a blowable poly(ethylene terephthalate) preform having a profiled exterior embossed surface design defined by exterior surface embossments forming preform wall sections which are thicker than the remaining preform wall sections, closing the sections of a blow mold around the preform at a temperature within the range from about 75 degrees C. to about 110 degrees C. where the material is susceptible to strain hardening, the mold section including respective neck defining portions which are closed into engagement with a portion of the preform to form the container neck;

in an essentially single operation, injecting blow fluid at a pressure of between about 100 psi and about 600 psi into the interior of the preform, expanding the preform outwardly to conform to said cavity, thus strain hardening the poly(ethylene terephthalate) material and stretching the thicker wall sections of the preform essentially proportionately to the remaining wall sections of the preform, the profiled preform embossed surface region being expanded against an essentially smooth mold wall surface on the mold sections, venting the fluid under pressure from the interior of the blown container to provide the blown container with said embossed surface decoration on the exterior of the blown container, and thereafter opening the mold sections to expose the blown container.

* * * * *